Aug. 4, 1931.  C. C. ENSMINGER  1,816,999
AGRICULTURAL MACHINE
Filed Jan. 21, 1929  5 Sheets-Sheet 1
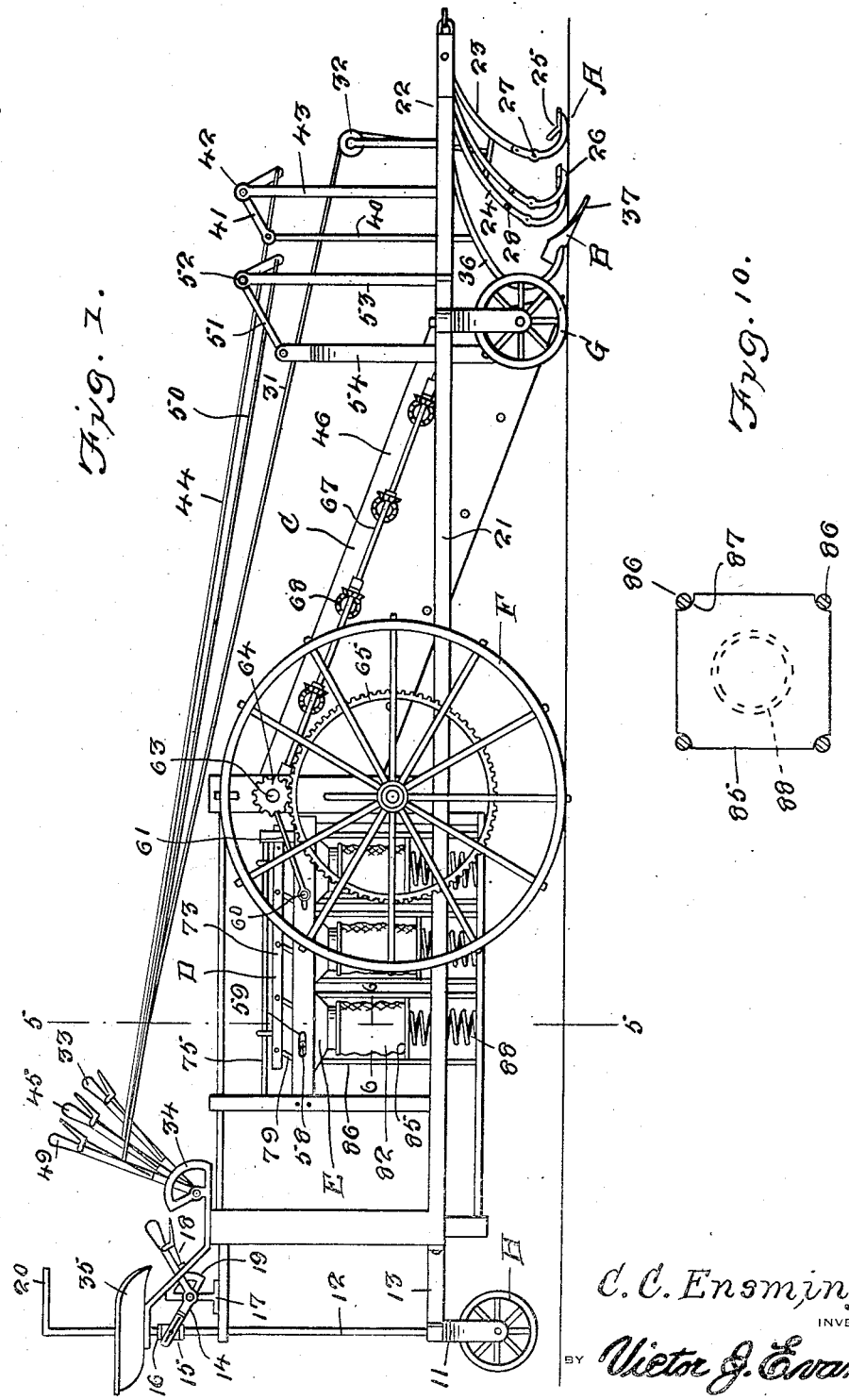
C. C. Ensminger
INVENTOR
BY Victor J. Evans
ATTORNEY

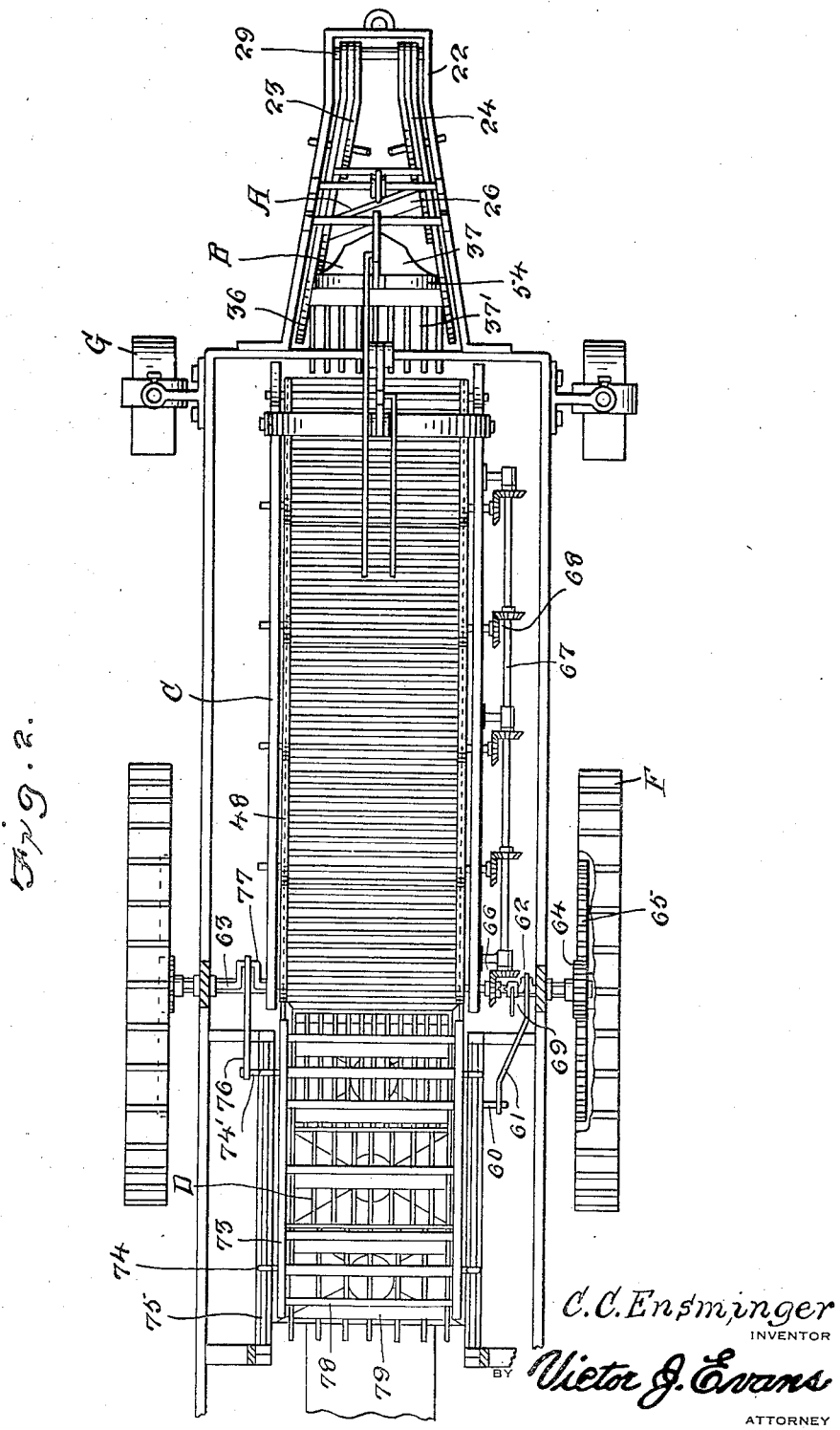

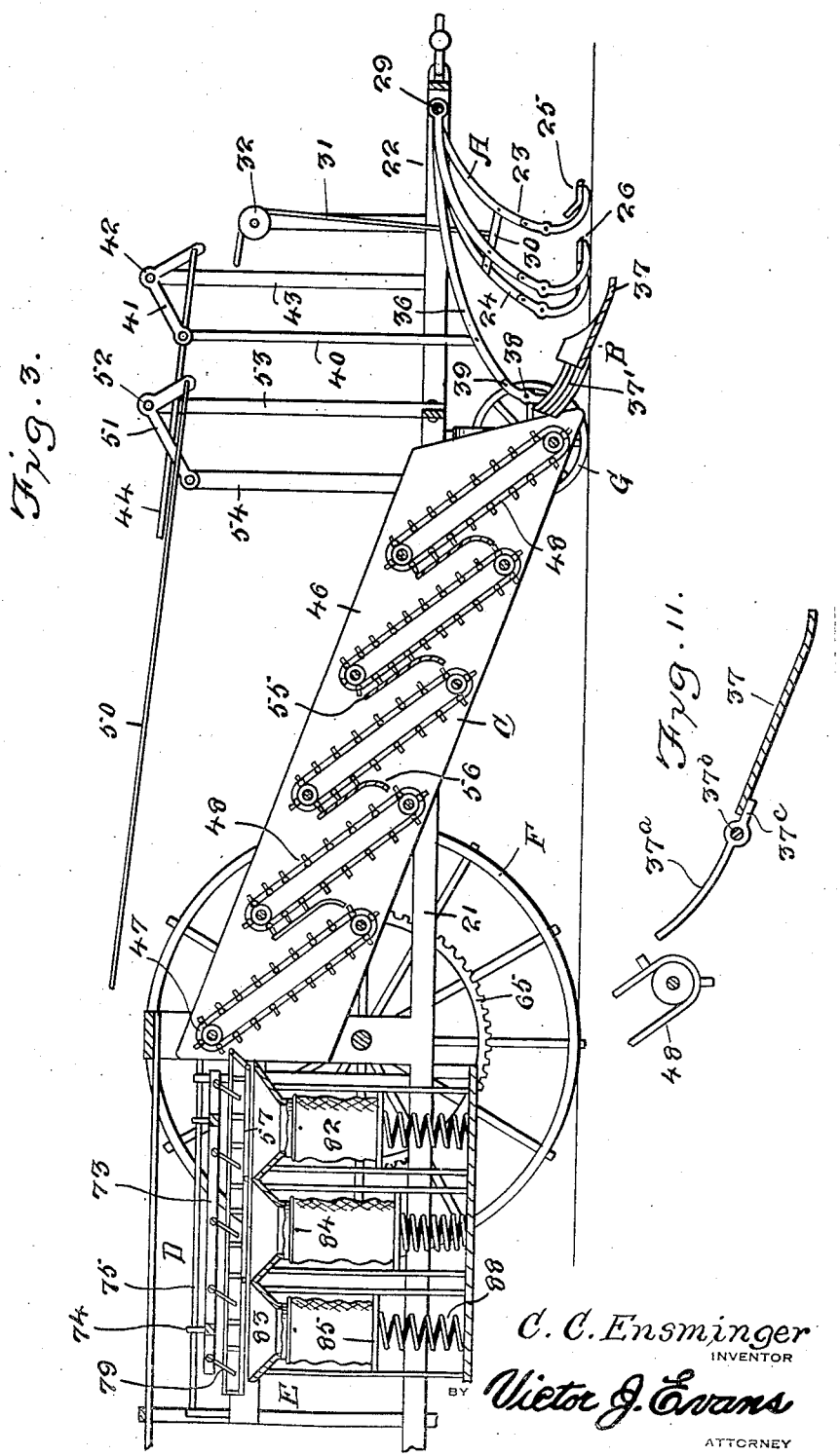

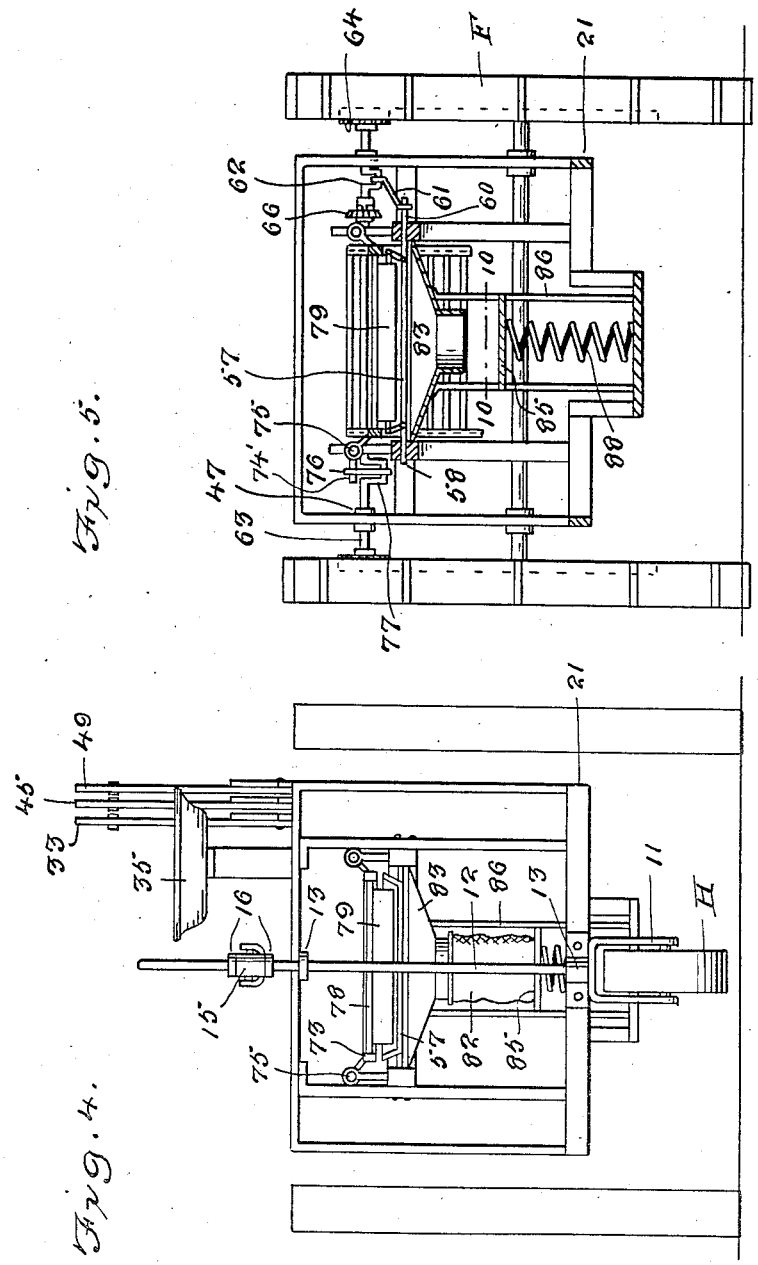

Aug. 4, 1931.         C. C. ENSMINGER         1,816,999
                   AGRICULTURAL MACHINE
               Filed Jan. 21, 1929        5 Sheets-Sheet 5
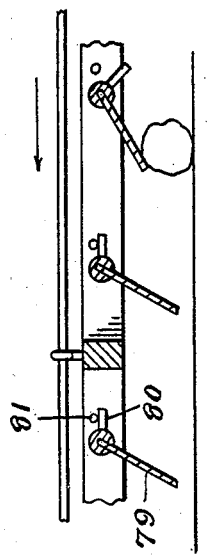
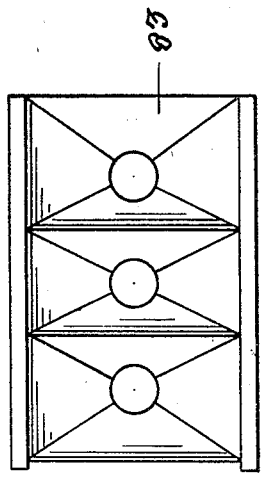
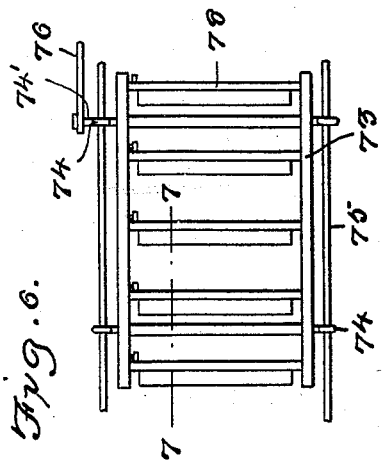
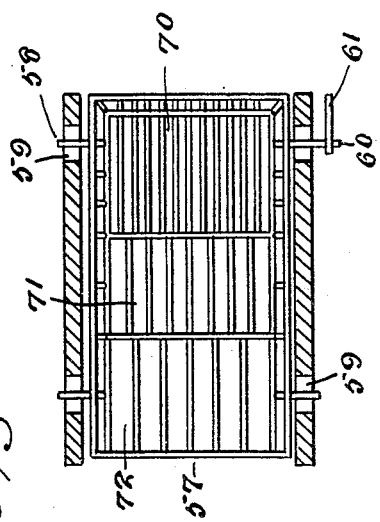
C. C. Ensminger
INVENTOR
BY Victor J. Evans
ATTORNEY Patented Aug. 4, 1931

1,816,999

UNITED STATES PATENT OFFICE

CHARLES C. ENSMINGER, OF JACKSONVILLE, FLORIDA

AGRICULTURAL MACHINE

Application filed January 21, 1929. Serial No. 333,939.

This invention relates to agricultural machines and has especial reference to machines for harvesting potatoes, (both sweet and Irish), beets, onions, etc., and may also be used to dig and gather peanuts.

An object of the invention is the provision of a machine by means of which potatoes may be dug, cleaned, sorted and sacked, additional means being provided for removing vines of sweet potatoes prior to digging, and for removing the tops of other vegetables.

With the above and other objects in view, the invention further includes the following novel features and details of construction, to be hereinafter more fully described, illustrated in the accompanying drawings and pointed out in the appended claims.

In the drawings:—

Figure 1 is a side elevation of a machine constructed in accordance with the invention.

Figure 2 is a top plan view of the same.

Figure 3 is a vertical longitudinal section.

Figure 4 is a rear elevation.

Figure 5 is a section on the line 5—5 of Figure 1.

Figure 6 is a fragmentary top plan view showing the pusher mechanism.

Figure 7 is an enlarged fragmentary sectional view on the line 7—7 of Figure 6.

Figure 8 is a detail top plan view showing the separating and sorting grate.

Figure 9 is a top plan view of the hoppers.

Figure 10 is an enlarged detail sectional view taken substantially on the line 10—10 of Figure 5.

Figure 11 is a fragmentary sectional view taken through the shovel and illustrating the pivotal mounting of the chute bars.

Referring to the drawings in detail wherein like characters of reference denote corresponding parts, the invention as shown comprises a main supporting frame which carries a vine lifter and cutter A, a blade or digger B, a conveyor C, a separator and grader D and a sacking mechanism E.

In addition, the frame is supported upon traction wheels F and front wheels G, while at the rear of the frame is a steering wheel H which is normally elevated and which may be lowered to raise the traction wheels free of the ground and operated to control the direction of movement of the machine so that the latter may be turned at the end of a row upon a relatively short radius. For this purpose, the wheel H is mounted within a fork 11 and this fork is carried at the lower end of a vertically disposed shaft 12 which is mounted in bearings 13 carried by the frame. The shaft 12 is vertically and rotatably movable and is held normally elevated by means of a bell crank lever 14 which has pivotal connection with a collar 15. This collar is swiveled upon the shaft 12 between collars 16 and the lever 14 is pivotally mounted as shown at 17. The lever carries a spring controlled latch 18 which engages a segment 19 so as to hold the lever in pivotally adjusted position. By operation of the lever, the wheel H may be formed downward into ground engaging position so as to elevate the wheels F and permit of a short turning movement of the machine.

In addition, as the wheels F act as drive wheels for the mechanism to be later described, this mechanism will cease to operate. Of course, the machine may also be turned with the wheels F in ground engaging position. The upper end of the shaft 12 carries a crank arm 20 and when the wheel H is engaged with the ground it may be manipulated through the crank handle 20. The wheel H may also be used as a steering wheel with the wheels F in ground engaging position.

The frame of the machine may be of suitable character and is indicated at 21. Extending from the front end of the frame is an extension 22 for connection with a tractor or other suitable traction means.

Carried by the extension 22 of the frame are double beams 23 and 24. The foremost beams 23 carry a vine lifting element 25, while the other beams carry a cutting blade 26 which is adapted to act upon and cut the vines lifted by the lifting element 25 and to slide the vines to one side. The beams 23 and 24 are of sectional formation and their sections are pivotally connected as shown at 27 and in order to hold them against pivotal movement pegs 28 of wood or other fragile material are provided. These pegs extend through openings provided in the adjacent ends of the sections of the beams 23 and 24 and when the vine lifting element or the cutting blade encounters an obstruction, these pegs will be broken so that the lower sections of the beams will move pivotally and injury will be thereby prevented.

The forward ends of the beams 23 and 24 are pivotally mounted as shown at 29. The beams are also connected as indicated at 30 so that they may be moved pivotally as a unit. The beams have connected thereto one end of a cable 31 which is trained over a guide pulley 32 mounted upon the frame extension and this cable extends rearward and is connected to a hand lever 33 which may be moved to regulate the height of the lifting element and cutting blade and may be held against accidental movement by means of a segment 34. The lever 33 is located within convenient reach of a seat 35 to be occupied by the operator.

Also pivotally mounted in the frame extension 22 is a beam 36 which carries a shovel or digger 37. This shovel or digger is designed to dig into the earth so as to remove the potatoes or other vegetables. The beam 36 like the beams 23 and 24 is of sectional formation and the sections are pivotally connected as shown at 38 and are held against pivotal movement by fragile pins 39. Pivotally connected to the beam 36 is one end of a rod 40 whose opposite end is pivotally connected to a bell crank lever 41 which is pivotally mounted as shown at 42 upon a standard 43 rising from the frame extension. The lever 41 has connected thereto one end of a rod or cable 44 whose opposite end is connected to an operating lever 45 similar to the lever 33 and also located within convenient reach of the operator's seat 35.

Located at the rear of the shovel or digger 37 is a frame 46 which is pivotally mounted upon a shaft 47. This frame carries a number of upwardly and rearwardly inclined short elevators or conveyors 48 with the upper ends of the conveyors spaced above and overlapping the lower ends of adjacent conveyors. The potatoes or other articles dug pass from the shovel or digger 37 onto the transfer member 37' carried thereby and are then taken up by the foremost conveyor and successively passed from one conveyor to the next until they reach the last conveyor. The frame 46 is adjustable and extends upwardly and rearwardly, the height of the front end of the frame being controlled by a hand lever 49 located convenient to the seat 35. This lever is connected by means of a rod 50 with a bell crank 51 and the latter is pivotally mounted as at 52 upon the upper end of a standard 53 which rises from the frame 21. The bell crank lever 51 is connected by means of double rods 54 with the front end of the frame 46 so as to control the height of the front end of this frame.

As thus far described it will be seen that the potatoes and other vegetables removed by means of the shovel or digger 37 will pass up the chute 37' to the foremost conveyor 48 and will be successively transferred from one conveyor to another until they reach the rearmost conveyor. By reference to Figure 2 of the drawings it will be seen that during the transfer of the potatoes from one conveyor to another they will drop and any dirt adhering to the potatoes will be shaken off. The potatoes will thus be subjected intermittently to a dropping operation during their travel from the front to the rear end of the frame 46.

In order to prevent the potatoes from falling through the frame, baffle plates 55 are provided between the conveyors 48 and the lower ends of these baffle plates are curved as shown at 56.

The potatoes or other vegetables passing from the rearmost conveyor 48 are received upon a grate 57. This grate is mounted for horizontal reciprocatory movement in the frame and for this purpose has extending therefrom pins 58 which operate through slots 59 provided in the frame. Extending from the frame is an arm 60 and this arm is connected by means of a rod 61 with a crank 62 which is included in a shaft 63. The arm 60 is preferably made of wood sufficiently strong to withstand ordinary usage, but will break under excessive strain and thus prevent injury to other parts of the machine. The shaft 63 is mounted in suitable bearings provided in the frame and carries at its outer ends pinions 64 which engage gears 65 fast with the wheels F. It may be here mentioned that suitable compensating devices may be provided for compensating for the difference in speed of rotation of the wheels F in making a turn so as to prevent injury to the shaft 63 or the other mechanism.

The conveyors 48 are also driven from the shaft 63 through beveled gears 66, the latter driving a shaft 67 which is mounted in suitable bearings carried by the frame 46 and which drives the conveyors through beveled gears 68. A clutch 69 may be provided to control the drive of the shaft 67.

The grate or separator frame 57 has a bottom divided into sections 70, 71 and 72, the bars of which successively widen, so that the smaller potatoes pass between the bars of the section 70 while the larger potatoes pass between the successively wider bars 71 and 72.

In order to facilitate the passage of the potatoes from the sections 70 to the sections 71 and 72, a pusher mechanism is provided. This mechanism includes a frame 73 which has extending therefrom arms 74 which slide upon guides 75. One of these arms is provided with an extension 74' preferably formed of suitable wood so that this extension will give when subjected to undue strain. This extension provides means for connection with a rod 76 which is in turn connected to a crank 77 included in the shaft 63. Pivotally mounted within the frame 73 are rods 78 which carry pusher blades 79 and these rods have extending therefrom studs or abutment fingers 80 which are adapted to engage pins or abutment elements 81 carried by the frame.

As the frame 73 reciprocates, the pusher blades 79 will engage the potatoes or other vegetables and push them rearward or in the direction of the arrow shown in Figure 7 of the drawings, forward movement of the frame permitting the pusher blades to ride freely over the vegetables so that no reverse movement will occur.

The potatoes or other vegetables passing between the bars of the grate 57 are received within sacks 82 and positioned between each section of the grate is a hopper 83 which guides the potatoes into their proper sacks. The sacks have their upper edges removably connected with the hoppers as shown at 84 while the lower ends of the sacks are supported upon platforms 85. These platforms are movable vertically between guide rods 86 and for this purpose the corners of the platforms may be notched as shown at 87 in Figure 10 of the drawings. Positioned beneath the platforms are coiled springs 88 which yieldingly support said platforms and rest upon a bottom plate, which, together with the guide rods, forms a frame for the sacking mechanism E. When the sacks 82 are empty the platforms 85 and consequently the bottoms of the sacks will be at their highest point so that the potatoes will not be subjected to a fall sufficient to bruise or injure them. As the sacks are filled, the weight of the contents will force the platforms downward and when the sacks become filled the operation of the mechanism may be stopped.

It is preferred to construct the transfer member 37' of individual bars 37a as shown in Figure 11 of the drawings and to mount these bars upon a pivot bar 37b which may be carried by the shovel 37. The bars 37a are provided with extensions 37c which engage the under side of the shovel 37 and limit downward pivotal movement. However, should these bars strike a rock or other obstruction they may move pivotally upward and thus prevent damage.

The invention is susceptible of various changes in its form, proportions and minor details of construction and the right is herein reserved to make such changes as properly fall within the scope of the appended claims.

Having described the invention what is claimed is:

1. In a harvesting machine, a crop digger, a crop receptacle, spaced inclined conveyors to convey the crop from the digger to the receptacle, the adjacent ends of said conveyors being arranged in spaced overlapping relation, and baffle plates mounted beneath the upper ends of the conveyors and having extensions curving downwardly and terminating adjacent the lower ends of the next adjacent conveyors between said conveyors.

2. In an agricultural machine of the class described, plant lifting members, a digging blade in rear of the said members, upwardly and rearwardly inclined transfer members extending from the rear side of the last mentioned blade, a series of rearwardly inclined conveyors in rear of the transfer members and having their relatively adjacent ends in spaced overlapping relation to one another throughout the series, and means at the upper end of the rearmost conveyor of the series for receiving and sorting the plant bulbs delivered thereto.

3. In an agricultural machine of the class described, plant digging means, means for supporting receptacles for the dug plants, a conveyor for conveying the plants from the digging means to the receptacles, and a separator between the conveyor and the receptacle support comprising a frame having a bottom, comprising series of parallel bars differently spaced in each series, a frame mounted for horizontal reciprocatory movement above the said separator frame, rods mounted transversely between the side members of the second mentioned frame, pusher blades carried by the rods for free passage over the plants, upon the separator bottom, abutment elements upon one side member of the second mentioned frame, and abutment fingers extending from the rods and engageable with the respective abutment elements in the opposite shifting movement of the second mentioned frame, whereby to maintain the said blades stationary in the movement of said frame in said direction, and whereby to advance the dug growth along said bars of the separator.

In testimony whereof I affix my signature.

CHARLES C. ENSMINGER.